United States Patent Office 3,521,864
Patented July 28, 1970

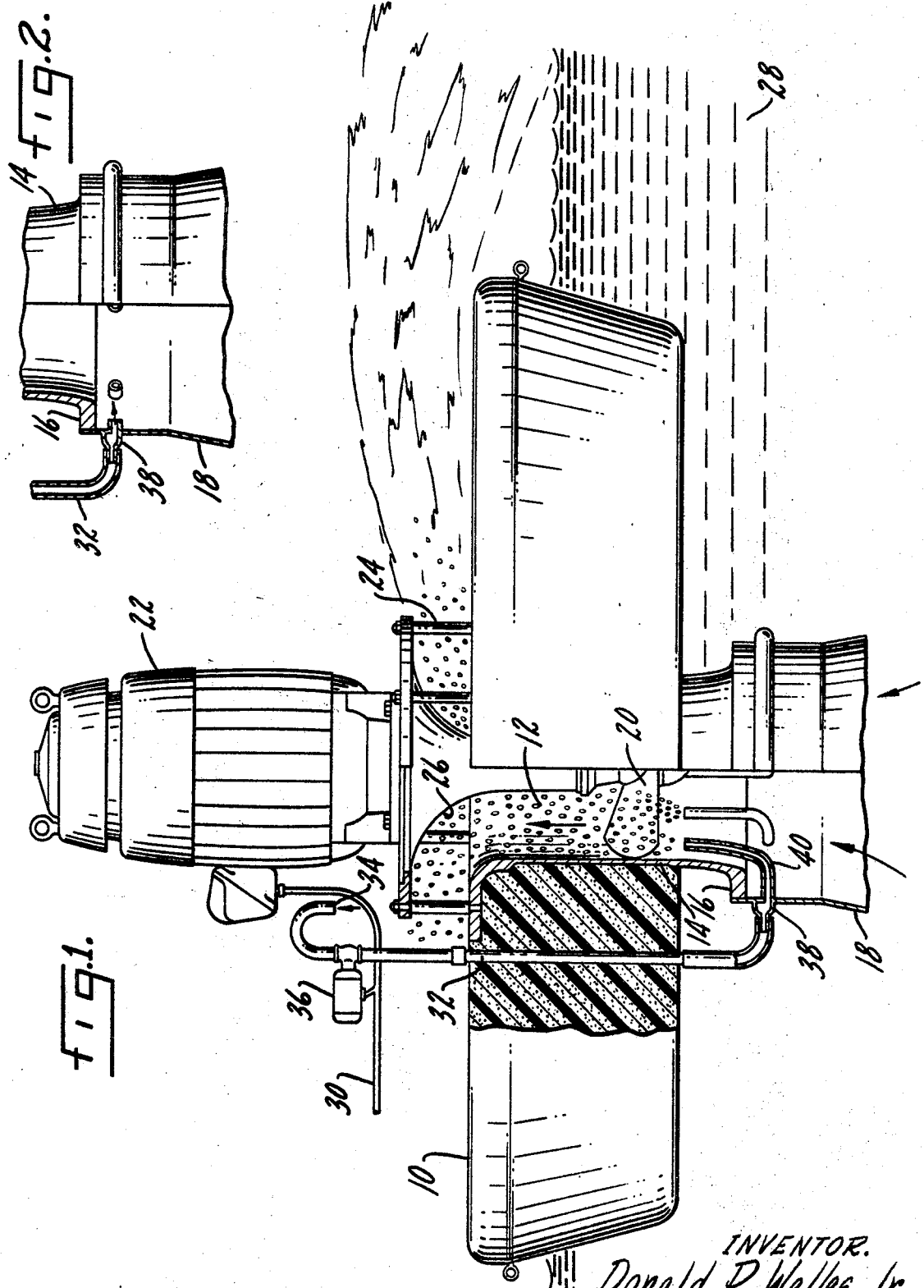

3,521,864
METHOD AND APPARATUS FOR CONTROLLING OXYGEN TRANSFER AND POWER REQUIREMENTS IN A WATER AERATION SYSTEM
Donald P. Welles, Jr., Rockford, Ill., assignor to Welles Products Corporation, Roscoe, Ill., a corporation of Illinois
Filed Sept. 20, 1967, Ser. No. 669,209
Int. Cl. B01d 47/02, 47/16
U.S. Cl. 261—77
3 Claims

ABSTRACT OF THE DISCLOSURE

This invention relates to a method and apparatus for controlling oxygen transfer and power requirements in a water aeration system. In particular, the invention relates to a water aeration system in which water is drawn from beneath the surface of a body of water and is then discharged on top of the surface of the water, thereby increasing the oxygen content of the water. Conventionally, such water aeration systems use a propulsion mechanism mounted either beneath the surface of the water, at the surface, or at least partially submerged in the body of water. The propulsion mechanism is driven by a motor mounted either above or below the surface of the water. The present invention controls power requirements by adding air to the water being moved by the propulsion mechanism, thereby changing its density.

---

The present invention relates to a method and apparatus for controlling oxygen enrichment and power requirements in a water aeration system.

A primary object of the invention is a control system of the type described which will permit the motor driving a water aeration system to be utilized in accordance with the oxygen demand of the fluid or water being treated.

Another object is a simply constructed and reliably operable control system to vary the oxygen enrichment and power requirements of a water aeration system.

Another object is a control system for a water aeration system in which air, for example at atmospheric pressure, is added beneath the surface of the body of water and adjacent the propeller moving the water to thereby control and regulate the density of the water being moved by the propeller.

Other purposes will appear in the ensuing specification, drawings and claims.

The invention is illustrated diagrammatically in the following drawings wherein:

FIG. 1 is a side elevation, in part, section, showing a water aeration apparatus of the type described, and FIG. 2 is a side elevation, showing a portion of a modified form of a water aeration apparatus of the type described.

Water aeration equipment has found wide use in the treatment of sewage, industrial waste, and in a variety of other applications in which it is desired to increase the oxygen content of a body of water to decrease its contamination. For example, in the treatment of sewage, unless the oxygen level in the fluid is kept at a certain level, the bacteria which are consuming waste in the ponds, do not have a chance to be fully utilized, and sewer gas and other noxious side products may result. In the treatment of industrial waste it is important to provide oxygen to treat the waste to avoid polluting the rivers, ponds, streams and lakes, into which industrial and municipal waste is conventionally discharged.

One established method for aerating a body of water or for increasing the oxygen in a body of water is to transfer oxygen to the water by taking water from beneath the surface and propelling it at or above the surface, thereby exposing it to an environment of substantially greater oxygen content, for example the surrounding atmosphere or air. Such a method of aerating water or of oxygen transfer has found wide usage in the treatment of municipal and industrial waste. Naturally, in such applications it is desired to provide the required oxygen at a minimum cost.

Oxygen requirements, both for municipal and industrial waste, will vary with the particular waste material being treated. Accordingly, it has long been desired to be able to control the oxygen transfer rate, so that minimum power requirements are utilized. Prior attempts at such control have been costly and not particularly satisfactory. For example, most mechanical aeration equipment is driven by an electric motor which is mounted above the surface of the water. The cheapest type of motor is a single speed motor. However, in order to provide control of the motor speed, which would control the amount of water being discharged and hence the amount of oxygen being transferred to the water, a variable speed motor is desirable. Another way of controlling motor speed is to use a rheostat. Again, this has not been found to be satisfactory due to cost. A third method of controlling the oxygen transfer rate is to vary the level at which the driving propeller is positioned relative to the surface. This must be done by ballast or some external means and has not been found to be wholly satisfactory.

In designing a sewage treatment plant, the oxygen transfer rate at the present time may be at a certain level, but it is anticipated that in five years' time this rate may be doubled, tripled or multiplied to even a greater extent. However, if the system is to be designed for future requirements, and a single speed motor is to be utilized, then operation of the system at the future power requirements will place the oxygen transfer rate substantially over that necessary at the present time and will place operation of the entire aeration system on a much more costly level than necessary. The answer is to control the oxygen transfer rate consistent with present requirements, thereby controlling the power requirements.

Industrial wastes may vary in strength from period to period, depending upon what particular process is being utilized at a plant. Hence, the oxygen demand of the system will vary from time to time. If the system is designed to take care of the maximum oxygen transfer rate, and if the system is run at full load, water aeration operations will be much more costly than necessary. The answer is to control the oxygen transfer rate in accordance with oxygen requirements. Only in this way can a water aeration apparatus be operated at a reasonable and justifiable cost.

In sewage treatment, an aeration apparatus may be used at different locations in a sewage pond in which density of the fluid may vary. Unless there is some way to control the density of the fluid passing through the aeration apparatus, it is likely that the motor driving the aeration apparatus will be overloaded. For example, in some areas the sewage sludge becomes substantially heavier than water, or has a greater density. The requirements of the aeration apparatus, that is, the motor requirements, may be such that they cannot continually handle such a heavier fluid without motor overload and consequent damage.

The present invention provides a simple and reliable method for controlling the oxygen transfer rate and hence the power requirements of a single speed motor. This is done by changing the density of the water being moved by the aeration apparatus. Basically, the system includes the introduction of air, for example at atmospheric pressure, in the area of the impeller which is beneath the surface of the water. Introducing air at this point has the effect of changing the density of the water being moved by the propeller. With a lower density, less power is drawn by the single speed motor and less water is actually moved. When the amount of water that is exposed above the surface is decreased, the oxygen transfer rate is reduced. If a high oxygen transfer rate is desired, more water should be moved and less air will be introduced beneath the surface of the water to decrease the density of the water.

FIG. 1 illustrates an apparatus for performing the method described. There may be a float 10, assuming the apparatus is float mounted, although this is not necessary. The float may be formed of polyester, stainless steel, or any other satisfactory material. At the center of the float is a water passage 12 which is defined by a conduit or pipe 14. The lower end of the conduit 14 extends beneath the float 10 and is outwardly flared, as at 16. Attached to the lower end of the conduit 16 is a flow forming tube 18, the lower portion of which is cut away.

Within the water passage 12 there is a propulsion mechanism, for example a propeller 20, which is attached to a shaft extending generally vertically upward and driven from a top-mounted single speed motor 22. The motor 22 may seat upon a framework indicated generally at 24. Coaxial with the propeller 20 is a water deflecting surface 26 which encloses the propeller shaft with the upper end of the water deflecting surface 26 being upwardly and outwardly curved so as to discharge water above the surface of the body of water 28, as indicated at the right of FIG. 1. The motor 22 may be driven by power supplied through an electric power line 30, which may extend to shore or some convenient electric distribution point.

In order to change the density of the water passing up through the passage 12, air is introduced, as shown herein, below the propeller 20. For this purpose an air conduit 32 extends upwardly through the float 10 and has an air intake 34 adjacent the motor. A valve 36 may control the flow of air down through the conduit 32 and the valve may be electrically controlled from a remote location. The conduit 32 may connect into a manifold or header 38 which surrounds the flow tube 18. There may be a plurality of inwardly and upwardly directed pipes 40 which are attached to the manifold 38 so as to form a general circumferential and axially disposed air discharge directed at the propeller 20.

As shown herein, air at atmospheric pressure will be drawn down through the conduit 32, as controlled by the valve 36, with this air being directed toward the propeller 20. The pressure differential caused by water moving past the open ends of pipes 40 will draw air down conduit 32. It is not necessary to have a compressor or other means for pushing air at a high velocity and pressure into the system. The water itself provides the force for drawing air from above the surface.

The air introduced into the water column or conduit 12 at the propeller changes the density of the water being moved by the propeller. As more air is added, the density of the water will decrease, as will the power utilized by motor 22.

When the oxygen transfer rate is to be high, to bring the surrounding water up to a particular oxygen requirement, it may be that the density of the water moved by the aerating system will not be changed and the aerating apparatus will operate at full load. In the event that oxygen requirements become lower, due to the discharge of a different type of waste, there is no need to run the aerating apparatus at full load and hence the density of the water can be reduced by adding varying amounts of air through the conduit 32. This change in density will decrease the amount of water actually discharged through the aerating apparatus and hence will decrease the oxygen transfer rate.

It has been determined that there is a general linear relationship between oxygen transfer rates and power requirements. For example, if the oxygen transfer rate can be reduced to 50 percent of normal, it has been found by tests that the power requirements are generally 50 percent of full load. In like manner, if the oxygen demand requirements are 75 percent of normal, it has been found that the power requirements are generally 75 percent of normal.

Although the invention has been disclosed in connection with an apparatus in which the external air is introduced below the propeller, the invention should not be so limited. Air may be introduced at a point above the level of the propeller. In like manner, it is not necessary that the air be at atmospheric pressure, as in some applications, compressed air may be introduced.

FIG. 2 illustrates a modified form. The flow tube 18 has a manifold 38, as shown in FIG. 1, but in this case the pipes 40 have been removed and the air is merely discharged directly into the column of water. The difference in structure between FIGS. 1 and 2 illustrates the fact that the particular shape, size and direction of the air discharged into the moving water column is not essential to the invention. What is important is to provide a means for changing the density of the water being moved by the propeller to thus control the power requirements consistent with the oxygen demand rate.

The addition of air into the moving water stream has a further advantage. Normally, the entire amount of oxygen transferred to the water takes place between the time the water leaves the aerating apparatus, until the time it strikes the surface of the surrounding body of water. However, in the present invention there is a second stage of oxygen transfer due to the addition of the air into the moving column of water.

Although the invention has been described in connection with a particular type of apparatus, obviously the basic principles disclosed herein have wide use; for example, the principle of controlling fluid density by air may be utilized in a pump.

Although the means for adding air to the water, or the aspirator, has been disclosed in a stationary form, a rotary or moving construction may also be satisfactory.

There are a variety of mechanisms for propelling or moving water. The apparatus shown uses a propeller, however, other propulsion mechanisms, such as paddle wheels or the like, may be equally satisfactory.

Whereas the preferred form of the invention has been shown and described herein, it should be realized that there are many modifications, substitutions and alterations thereto, within the scope of the following claims.

What is claimed is:

1. A method of controlling the relationship between oxygen demand and power requirements in a water aeration system in which water is taken from at or beneath the surface of a body of water to be discharged above the water surface and into the atmosphere, said water being moved in a confined stream by a propulsion mechanism in the water which is driven by a motor attached thereto, comprising the steps of adding air, at atmospheric pressure, and in general axial alignment with the propulsion mechanism, to the confined stream of water immediately beneath the propulsion mechanism and in an area of generally constant cross section to change the density of the water being moved by the propulsion mechanism, and regulating the amount of air added beneath the propulsion mechanism to establish a proportional relationship between the power required by the aerator and the oxygen required by the body of water by regulating the weight of water interacting with the oxygen above the water surface.

2. The method of claim 1 further characterized in that air is drawn beneath the body of water, from above its surface.

3. The method of claim 1 further characterized in that said motor is a single speed electric motor.

References Cited

UNITED STATES PATENTS

| | | | |
|---|---|---|---|
| 1,867,824 | 7/1932 | Hammerly | 210—198 |
| 2,063,301 | 12/1936 | Durdan | 261—24 X |
| 3,154,601 | 10/1964 | Kalinska et al. | 261—93 |
| 1,526,596 | 2/1925 | Greenawalt | 261—93 |
| 2,521,396 | 9/1950 | Moul | 261—93 |
| 2,827,268 | 3/1958 | Staaf | 239—17 X |
| 2,865,618 | 12/1958 | Asbell | 261—93 |
| 3,207,314 | 9/1965 | Pearson | 261—93 X |
| 3,320,160 | 5/1967 | Wells et al. | 261—93 X |

FOREIGN PATENTS 637,457    2/1962    Canada.

FRANK W. LUTTER, Primary Examiner.

S. H. MARKOWITZ, Assistant Examiner

U.S. Cl. X.R.

210—219, 220, 242; 239—22; 261—91, 93, 120, 121